Patented May 1, 1928.

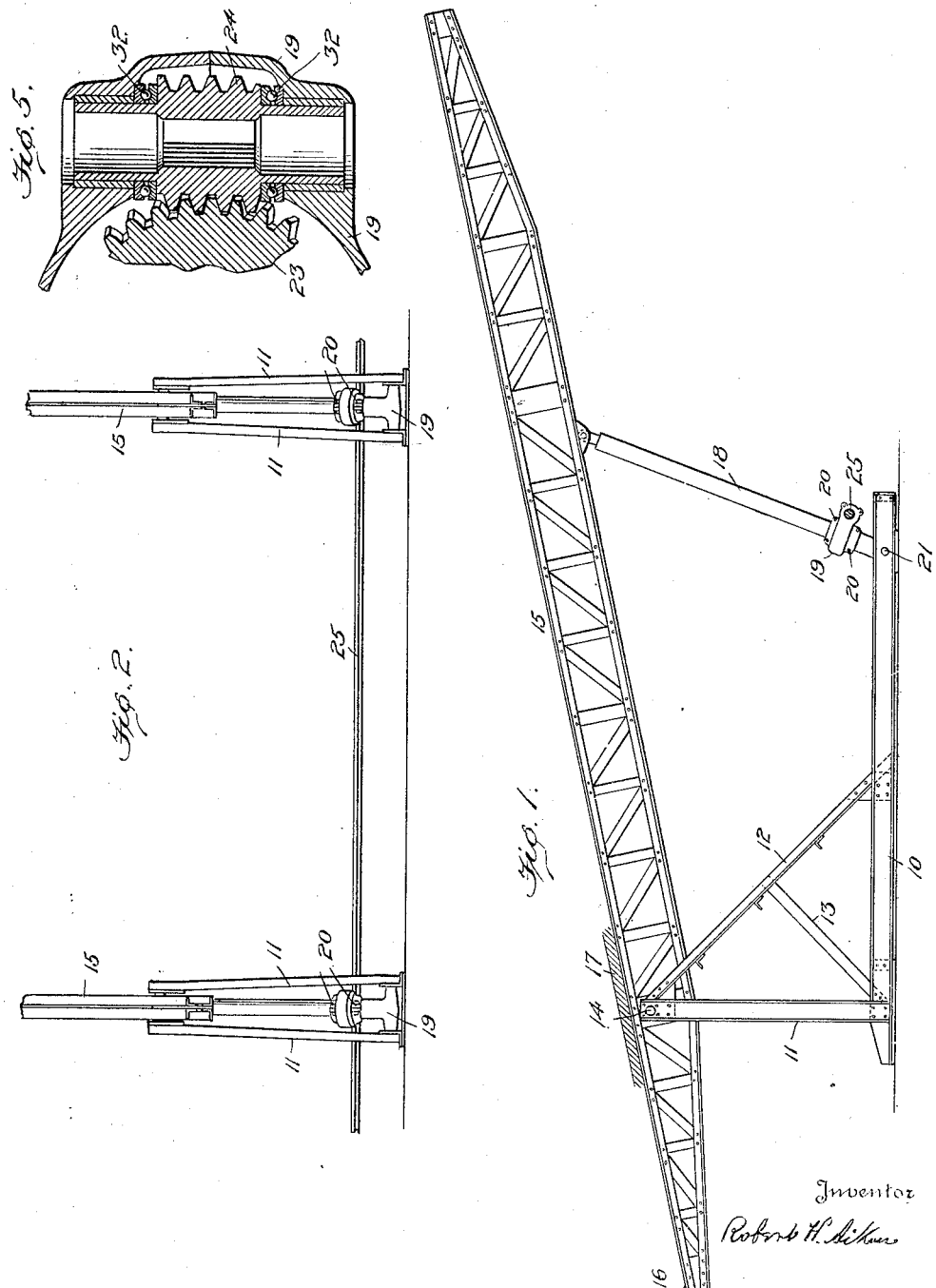

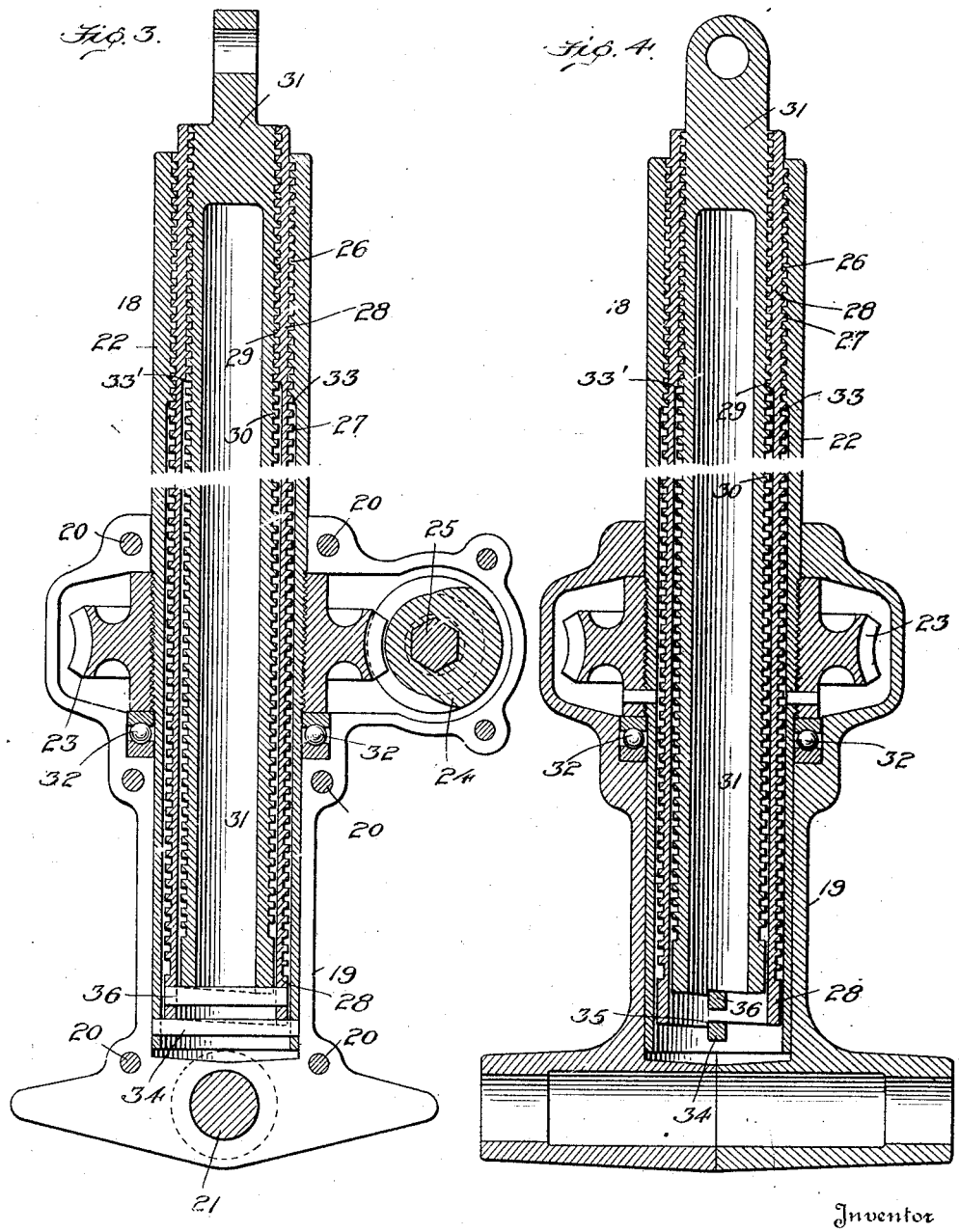

1,668,299

UNITED STATES PATENT OFFICE.

ROBERT H. AIKEN, OF WINTHROP HARBOR, ILLINOIS; JANNETTE K. AIKEN ADMINISTRATRIX OF SAID ROBERT H. AIKEN, DECEASED.

APPARATUS FOR ERECTING REENFORCED-CONCRETE BUILDING WALLS.

Application filed April 17, 1922. Serial No. 553,511.

Heavy reenforced concrete walls have heretofore been formed and allowed to become fully set while in approximately horizontal position and have then been swung upward, about a horizontal axis, to vertical position to rest upon a permanent foundation. It is desirable to have that axis at some distance from that side of the wall which is to meet the foundation so that in raising the lower part of the wall may balance a corresponding part upon the opposite side of the axis. For such heavy walls especially if they are to be high, lifting force must be applied at some distance from the pivotal axis, and if the lifting device be a screw jack, as is very desirable, the jack must be extensible to an unusual extent. Practically the whole apparatus must be readily handled or separable into parts that may be conveniently transported from place to place, preferably on common vehicles, and reassembled. To secure these ends with simple, comparatively inexpensive effective apparatus of moderate dimensions is the object of this invention.

In the accompanying drawings,

Fig. 1 is a side elevation of the apparatus showing one of a plurality of duplicate mechanisms.

Fig. 2 is a view looking from the right hand in Fig. 1.

Fig. 3 is an enlarged view showing an extensible screw, of telescopic form, and its driving devices, all mounted in half of an axially divided casing.

Fig. 4 is a sectional view, the plane of section being at right angles to the plane of division of Fig. 3.

Fig. 5 is a detail view illustrating the engagement of a worm with a worm gear which actuates the screw.

In these views, 10 indicates a strong base, like the rest of the structure preferably of steel, 11 upwardly converging post members braced by members 12, 13 and carrying near their upper ends a heavy horizontal pivot 14, upon which is supported a platform slightly inclined from horizontal position and including a truss beam 15 having at its lower end an upwardly projecting stop 16 and bearing upon its upper side a preferably detachable sheet 17 of suitable material. This beam is pivotally connected to the upper end of a telescopic jack screw 18 the lower end of which is pivoted to the frame 10 at some distance from the post 11. This construction allows the upper end of the extending screw to swing toward the vertical axis of the posts as its extending swings the beam about its pivot 14.

The screw is provided with a heavy casing 19 which is formed in halves which are secured together by bolts at 20, and mounted upon a heavy elongated pivot 21 in the base frame 10. In the casing 19 is a heavy revoluble tubular member 22 upon which permanently fixed, by screw threads and pins or otherwise, a worm gear 23 driven by a worm 24 upon a power shaft 25 which is non-circular in cross section. The upper portion of this member 22 is internally threaded at 26 and engaged with the external threads 27 of a tube 28 having internal threads 29 to engage external threads 30 of a third central non-rotary member 31 shown as partly hollow.

The worm gear 23 is supported by ball bearings 32, so that it may be readily rotated even when carrying great weight.

The member 22 at the point 33 where its internal threads begin is thickened to form an abrupt shoulder, and across the lower part of this member is fixed a diametrical bar 34 which is engaged by an offset 35 in the lower margin of the tube 28. The tube 28 is in turn provided with a cross-bar 36. Each cross-bar limits the possible relative descent of the member next above and prevent rotation in the wrong direction, while never having extensive frictional-surface engagement.

As the worm forcibly rotates its worm gear and sleeve 22 the threads in the upper part of the latter compel the rotary sleeve to rise carrying with it the axial member and thus lifting the beam 15, the sheet 17, and any wall thereon. It is not material whether the rotary tube 28 rotates at the outset or is merely lifted by the outer sleeve. It may be lifted until its rising is barred by the shoulder 33 after which its forcible rotation compels it to raise the internal shaft, the shoulder at 28' limiting this movement, when the jack is fully extended.

As these jacks are duplicates and aligned, the power shaft may extend from each to the next and all will then be rotated equally and each will thrust the beams upward to exactly the same distance as every other jack of the series.

What I claim is:—

1. The combination with a series or parallel two-part horizontal beams, of a two-part upright post near one end of each of said beams, two-part braces uniting the upper parts of said posts to the corresponding parts of said beams, wall-carrying trusses having respectively, between their ends trunnions supported in the corresponding double posts, and telescoping tubes each in threaded engagement with the next enclosed tube, means for rotating the outer tube of each jack, and means for limiting the relative movement of the tubes in either direction.

2. The combination with a series of parallel two-part horizontal beams, of a two-part upright post near one end of each of said beams, two-part braces uniting the upper parts of said posts to the corresponding parts of said beams, wall-carrying trusses having, respectively between their ends trunnions supported in the corresponding double posts, and compound lifting devices each pivoted below to the base and above to the corresponding truss and each made up of overlapping members movable on each other to increase the length of the device, means for limiting the relative movement of said overlapping members and means for forcibly extending and holding extended the several devices.

3. The combination with a horizontal member, a two-part upright post near one end of said base member having aligned trunnion bearings at the upper ends of said two parts, braces from said base member to said posts, a telescoping lifting member having means for limiting the relative movements of its telescoping sections, pivotally supported by bearings near one end of said base member, a wall carrying truss supported near one end by trunnions in the bearings of said posts and near the opposite end pivotally attached to the upper end of said lifting member, and adapted for swinging from an initial approximately horizontal position to erect position by the extension of said lifting member.

In testimony whereof I hereunto affix my signature.

ROBERT H. AIKEN.